Sept. 22, 1953     L. J. HAWORTH     2,653,312
INDICATOR APPARATUS FOR RADIO OBJECT LOCATING SYSTEMS
Filed Aug. 1, 1945
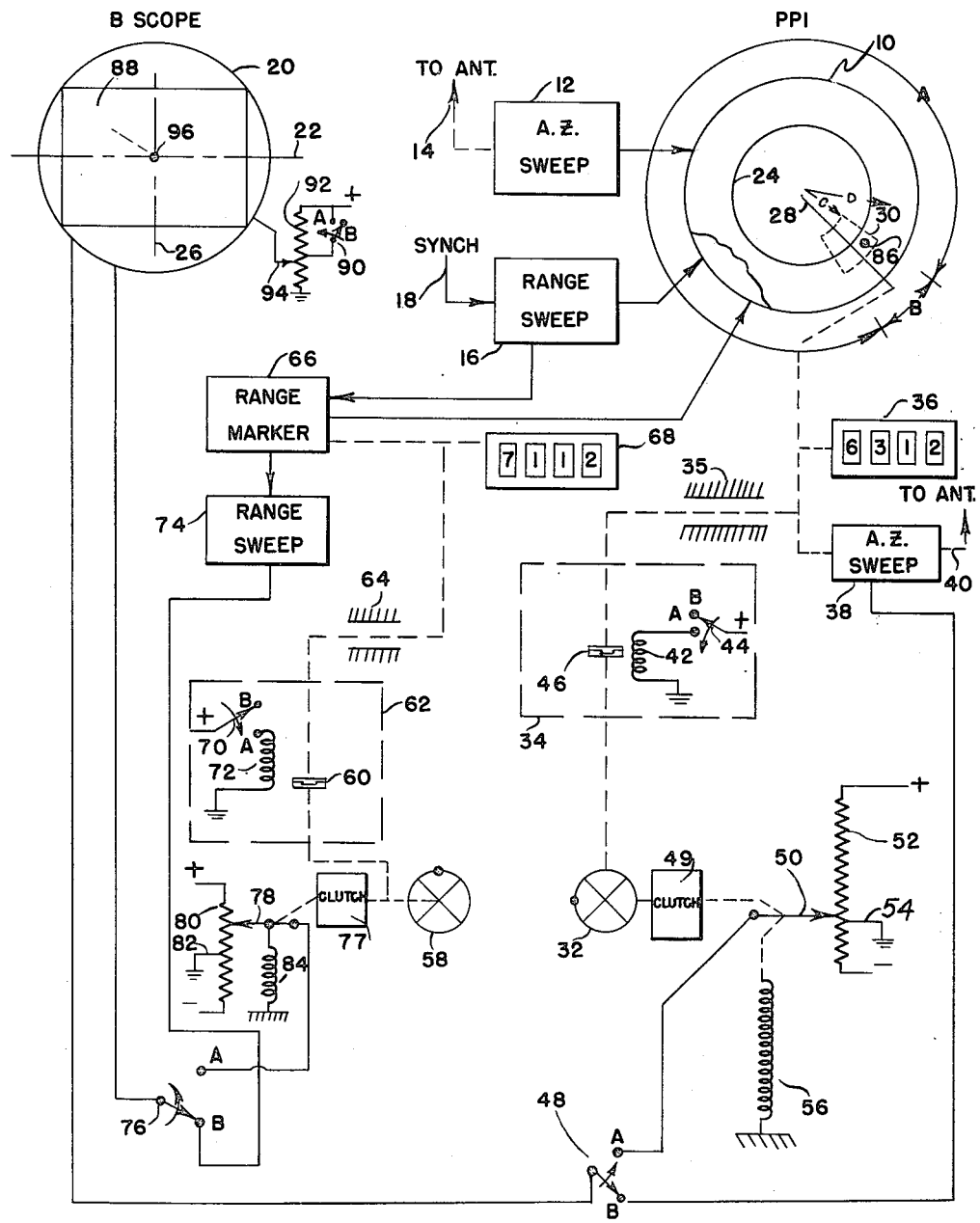
INVENTOR.
LELAND J. HAWORTH
BY
*William D. Hall,*
ATTORNEY.

Patented Sept. 22, 1953

2,653,312

UNITED STATES PATENT OFFICE 2,653,312

INDICATOR APPARATUS FOR RADIO
OBJECT LOCATING SYSTEMS

Leland J. Haworth, Cambridge, Mass., assignor,
by mesne assignments, to the United States of
America as represented by the Secretary of War Application August 1, 1945, Serial No. 608,157

7 Claims. (Cl. 343—11)

This invention relates to indicator systems and more particularly to indicator systems for use in conjunction with radio object-locating devices.

Several types of radio object-locating systems now in use are capable of searching for targets in a complete 360-degree sector about their position. The maximum range of search for any particular set depends on several factors including terrain, frequency employed by the radio object-locating system, type of target and so forth, so that no general statement can be made as to the maximum range of any group of sets except to state that it will be at least several miles. It is desirable to display the information from the entire area of search on one indicator so that this information may be correctly interpreted and evaluated. It is possible to make such a presentation on a type of indicator known as a "plan position indicator" or P. P. I. This type of indicator is well known in the art, but a brief description thereof has been included herein. While the plan position indicator displays the whole area of search, the scale at which this data is presented is of necessity small. It is highly desirable, therefore, that some means be provided for expanding any portion of the presentation on the plan position indicator so that a more detailed study may be made of targets in this area and so that accurate measurements of the range and azimuth may be made with respect to any target.

It is an object of this invention, therefore, to provide means for displaying the information obtained from a radio object-locating system in such a manner that the whole area searched is presented on one indicator while a second indicator is available to display to an expanded scale any selected portion of the area covered by the first indicator.

It is a further object of the invention to provide means for accurately measuring range and azimuth of any of the targets appearing on the above mentioned indicators.

For a better understanding of the invention, together with other and further objects thereof, reference is had to the following description taken in connection with the accompanying drawing which is a schematic diagram of the invention.

The main presentation of data for this radio object-locating system is made on a cathode ray tube 10 which is arranged as a plan position indicator or P. P. I. In this type of presentation a spot is made to appear on the face of the cathode ray tube in such a position that the angle between any arbitrary radius taken as a reference and a radius passing through the spot is equal to the azimuth of the target producing the spot with reference to any arbitrary reference line on the earth's surface. The distance from the spot on the cathode ray tube face to the center of the face is proportional to the distance from a fixed reference point (usually the antenna of the radio object-locating device) to the target causing the spot on the face of the cathode ray tube. The azimuth sweep for cathode ray tube 10 is provided by azimuth sweep unit 12. The dotted line 14 indicates a connection to the antenna of the radio object-locating device that provides a method of synchronizing the azimuth sweep. The range sweep for tube 10 is provided by range sweep unit 16. The connection 18 marked "synch" in the drawing indicates that a connection is made to the receiver or the transmitter of the radio object-locating device for the purpose of synchronizing the start of the sweep with the time of transmission of the pulse from the radio object-locating system.

A second cathode ray tube 20 is connected as a "B-scope" for the purpose of presenting, on an expanded scale, a portion of the information displayed on tube 10. Such a presentation is sometimes referred to as a "sectional B-scope." The vertical distance from the center line 22 on tube 20 to a spot on the face of the tube is proportional to the distance from the target causing the spot to an arbitrary reference point whose range is indicated by range line 24 on tube 10. Line 24 is applied to the face of tube 10 in a manner to be described later. The horizontal distance from the center line 26 on cathode ray tube 20 to a spot on the face of the tube is proportional to the azimuth of the target causing the spot with respect to an arbitrary reference line represented by mechanical marker 28 on tube 10. It can be seen from the above description that the area displayed by the tube 20 will be centered about the intersection of line 24 and mechanical marker 28 on tube 10. This area is represented by the dotted line 30 on tube 10, but it should be understood that no such boundary line normally appears on the face of tube 10; however such an indication may be made if so desired in a manner well known in the art. It can be seen from the drawing that the area bounded by line 30 is a portion of a sector having an angle "B" and bounded by range circles having radii represented by "C" and "D," respectively. For purposes of reference the angle not included in angle B is given the reference letter "A."

The selection of the location of the sector "B" in azimuth is done in the following manner. A selector handwheel 32 is connected through a magnetic clutch 34 and a friction sleeve 35 to the mechanical marker 28, to a revolution counter 36 and to an azimuth sweep selector 38. Sweep selector 38 may be any of the circuits known to the art that will provide scope 20 with a suitable azimuth sweep over the selected sector. One example of such a circuit is illustrated in the copending application by Leland J. Haworth, entitled "Cathode Ray Tube Circuit," Serial No. 537,318, filed May 25, 1944, and issued March 4, 1952, as Patent No. 2,588,114. A connection 40 is made to the antenna of the radio object-locating system from selector 38 to provide means for synchronizing the sweep on tube 20 with the rotation of the antenna. Clutch 34 has a coil 42 that is connected between a positive terminal and ground through a two-position switch 44. The two positions of the switch are marked "A" and "B" to correspond to the connection that is made during sectors "A" and "B" on tube 20. Switch 44 may be a set of contacts operated by a relay in selector 38 or any other means known to the art for operating the switch 44 in the above described manner may be used if desired. When coil 42 is energized, engaging clutch plates 46, handwheel 32 moves marker 28 in azimuth to the desired point. The azimuth of mechanical marker 28 is indicated at all times by counter 36. Turning handwheel 32 also causes selector 38 to select the proper B sector. The azimuth sweep provided by selector 38 is applied to tube 20 through contact B on switch 48. Switch 48 is also a two-position switch and may be operated in exactly the same manner as switch 44. Handwheel 32 is also connected through a clutch 49, similar to clutch 34, to a movable tap 50 of a potentiometer 52. Potentiometer 52 is connected between a positive and a negative potential as indicated by the plus and minus signs, respectively. A center tap 54 on potentiometer 52 is maintained at ground potential. Suitable mechanical means illustrated schematically by spring 56 is provided to return tap 50 to point 54 whenever clutch 49 is deenergized. The purpose of potentiometer 52 will be fully explained following the description of the range selector circuit.

The range selector system is very similar to the azimuth selector system. A range selector handwheel 58 is connected through plates 60 of a magnetic clutch 62 and through a friction sleeve 64 to a range marker circuit 66. A mechanical connection is also made to a counter 68 which provides an indication of the range to the target. Clutch 62 is similar to clutch 34. Switch 70 in clutch 62 operates in synchronism with switch 44 so coil 72 is energized for the same period that coil 42 is energized. Range marker circuit 66 is any of the types of circuits well known in the art that will produce an indication at a time after a first indication, the time interval between the two indications being controlled manually. Range marker circuit 66 receives a synchronized signal from range sweep unit 16. Circuit 66 supplies a signal to tube 10 to produce range line 24 on this tube. The range at which this line appears is controlled by handwheel 58. Circuit 66 also supplies an initiating signal to a range sweep circuit 74 at such a time that the area displayed on B-scope 20 is always centered about range line 24 on tube 10. The above mentioned copending application also illustrates a circuit for selecting a range section centered about a selected range. The output of circuit 74 is connected to tube 20 through contact B on switch 76. Switch 76 operates in synchronism with switch 44. Handwheel 58 is also connected through a clutch 77, similar to clutch 62, to a tap 78 on a potentiometer 80. Potentiometer 80 is connected between a source of positive potential and a source of negative potential represented by the plus and minus signs, respectively. A center tap 82 on potentiometer 80 is maintained at ground potential. Mechanical means, illustrated schematically by spring 84, is provided to return tap 78 to tap 82 whenever clutch 77 is deenergized.

Suppose now that range line 24 and mechanical marker 28 are in the position shown in the drawing and that the sweep on tube 10 is just entering the area bounded by line 30. Under these conditions switches 44, 48, 70, and 76 will be in the position marked "B." As the sweep passes over sector B, assume a spot of light 86 representing a target appears in the position shown in the drawing. A similar spot of light 88 will appear on tube 20 representing the same target. It can be seen from tube 10, but more clearly from tube 20 since spot 88 does not occur at the intersection of lines 22 and 26, that the intersection of range line 24 and mechanical marker 28 does not coincide with the spot of light 86. No correction can be made in the position of this intersection while sector B is being scanned for two reasons: (1) The time of scanning for a particular target is very short; and (2) the clutches 62 and 34 are disengaged. Once the sweep on tube 10 has passed out of sector B, the position of spot 88 cannot be changed relative to the lines 22 and 26; and since tube 20 is the only method available for accurately positioning mechanical marker 28 and range line 24, some auxiliary indication that can be moved must be provided on tube 20. This auxiliary indication is provided in the following manner. Tube 20 is so connected that when the potential supplied to the deflection plates through switches 76 and 48 is zero the cathode ray beam will be directed at the intersection of lines 22 and 26. Just such a potential as this will be applied to the deflection plates as soon as switches 48 and 76 move to the A position. Some means must be provided to make a spot of light visible on tube 20 since tube 20 is usually operated below the threshold of visibility. This means is illustrated schematically by switch 90 short-circuiting a portion of resistor 92 when switch 90 moves to the A position. Tap 94 on resistor 92 may be connected to the control grid of tube 20. The intensified cathode ray beam impinging on the face of tube 20 now causes a spot of light 96 to appear at the intersection of lines 22 and 26. Spot 96 is now moved to coincide with spot 88, which, due to the persistence of the cathode ray tube, is still visible, by rotating handwheels 58 and 32. Handwheel 58 moves tap 78 in such a direction that spot 96 moves vertically, while handwheel 32 moves tap 50 in such a direction that spot 96 moves horizontally. The connection between handwheel 58 and range marker unit 66 is such that range line 24 is moved out to coincide with spot 86 when spot 96 is on the same horizontal line as spot 88 and the connection between handwheel 32 and mechanical marker 28 is such that the reference edge of this marker passes through spot 86 when spot 96 is in the same vertical line as spot 88. Moving spot 96 to coincide with spot 88, therefore, accurately positions the intersection of range line 24 and mechanical marker 28 over spot 86 and also adjusts azimuth sweep unit 38 and range sweep unit 74 so that the next time that the sweep on tube 20 passes through sector B spot 88 will occur at the intersection of lines 22 and 26. Since taps 50 and 78 are automatically moved to a point of ground potential as soon as the sweep starts to enter the B sector for a second time, spot 96 will still coincide with spot 88 on tube 20, both spots 88 and 96 now appearing at the center of tube 20. Friction sleeves 35 and 64 are provided to prevent springs 56 and 84 from moving mechanical marker 28 or range line 24 when clutches 34 and 62 are engaged and to prevent the same two indications from moving when handwheels 58 and 32 are disengaged by the two clutches. The accurate azimuth and range to the spot on tube 20 may be read from counters 36 and 68. Some electromechanical transfer means such as selsyns may be employed if desired to transfer this range and azimuth information to a distant point. The range counter may be calibrated in yards, meters or any other convenient unit, and the azimuth counter 36 may be calibrated in degrees, mils or any other convenient unit with any convenient direction taken as the reference direction.

It can be seen from the drawing and the above description that this system has many advantages. The targets in the entire area surrounding the radio object-locating system associated with this indicator may be displayed on the plan position indicator, any sector of the plan position indicator may be selected for presentation to an expanded scale on the B-scope, reference markers may be accurately positioned in range and azimuth the first time an indication from the selected target appears on the B-scope, and an accurate, easily readable presentation of the range and azimuth to the target is available on the two counters.

While there has been described what is at present considered the preferred embodiment of the invention, it will be obvious to those skilled in the art that various changes and modifications may be made therein without departing from the invention.

What is claimed is:

1. In combination with a radio object locating system having antenna means for repeatedly scanning a sector in space with a beam of electromagnetic energy and a plan position indicator for displaying on the screen thereof data indicative of the range and azimuth of targets illuminated by said system, an improved apparatus for accurately determining the range and azimuth to one of said targets comprising a moveable mechanical azimuth marker mounted over said screen, means for rendering visible on said screen a moveable range marker, first and second positioning means for varying the position of said azimuth marker and said range marker respectively, vernier indicator means, means for causing a first indication to appear on said vernier indicator representative of the point of intersection of said azimuth marker and said range marker, means for causing a second indication to appear on said vernier indicator representative of a selected target, the relative location of said two indications on said vernier indicator being indicative of the difference between the range and azimuth indicated by said range and azimuth markers respectively and the true range and azimuth to the selected target at the instant said target is illuminated by energy radiated by said antenna, means coupled to said first and second positioning means for moving said first indication on said vernier indicator into coincidence with said second indication on said vernier indicator whereby the point of intersection of said azimuth marker and said range marker accurately represents the position of the selected target, and means coupled to said azimuth marker means and to said means for rendering visible on said screen a movable range marker for indicating the range and azimuth to the target represented by said point of intersection.

2. In combination with a radio object locating system having antenna means for repeatedly scanning a sector in space with a beam of electromagnetic energy and a plan position indicator for displaying data indicative of the range and azimuth to targets in space causing indications to appear thereon, an improved apparatus for accurately determining the range and azimuth of one of said targets in space comprising a radial marker mounted on the screen of said plan position indicator, a first control means for manually moving said radial marker into coincidence with the indication on said plan position indicator representing a selected target, means coupled to said radial marker for accurately indicating the azimuth angle represented by the position of said radial marker, means for causing a circular range mark to appear on said indicator, second control means for moving said range mark into coincidence with said selected target indication, means coupled to said second control means for accurately indicating the range represented by the position of said range mark, an auxiliary indicator, means for causing a luminous spot to appear on the screen of said auxiliary indicator during the time said antenna is scanning a sector in space including the azimuth represented by said radial marker, the position of said spot with respect to a first reference line being indicative of the difference between the azimuth to the selected target and the azimuth represented by said radial marker and the position of said spot with respect to a second reference line being indicative of the difference between the range to the target and the range represented by said circular range marker, the scale of presentation on said auxiliary indicator being greater than the scale of presentation on said plan position indicator whereby said auxiliary indicator provides means for accurately positioning said radial marker and range marker in coincidence with said selected target indication appearing on said plan position indicator.

3. In combination with a radio object locating system having antenna means for repeatedly scanning a sector in space with a beam of electromagnetic energy and a plan position indicator for displaying data indicative of the range and azimuth to targets in space causing indications to appear thereon, an improved apparatus for accurately determining the range and azimuth of a selected target in space comprising a radial marker mounted on the screen of said plan position indicator, first control means for manually moving said radial marker into coincidence with the indication on said plan position indicator representing said selected target, means coupled to said radial marker for accurately indicating the azimuth angle represented by the position of said radial marker, means for causing a circular range mark to appear on said indicator, second control means for moving said range mark into coincidence with said selected target indication, eans coupled to said second control means for curately indicating the range represented by e position of said range mark, an auxiliary thode ray tube indicator, means for causing a minous spot to appear on the screen of said ixiliary indicator during the time said antenna scanning a sector in space including the imuth represented by said radial marker, the )sition of said spot with respect to a first ference line being indicative of the difference tween the azimuth to the selected target and e azimuth represented by said radial marker, id the position of said spot with respect to a cond reference line being indicative of the fference between the range to the target and e range represented by said circular range arker, and means for indicating on said auxilry indicator when said first and second control eans have been adjusted to eliminate said difrence between the azimuth indicated by said dial marker and the true azimuth of the secected target and the difference between the nge indicated by said range mark and the ue range to said target.

4. In combination with a radio object locatg system having antenna means for repeatedly anning a sector in space with a beam of elecomagnetic energy and a plan position indicator r displaying data indicative of the range and imuth to targets in space causing indications appear thereon, an improved apparatus for curately determining the range and azimuth one of said targets in space comprising a radial arker mounted on the screen of said plan )sition indicator, first control means for manilly moving said radial marker into coindence with a selected target indication on id plan position indicator, means coupled to id radial marker for accurately indicating the imuth angle represented by the position of said dial marker, means for causing a circular nge mark to appear on said indicator, second ntrol means for moving said range mark into incidence with said selected target indication, eans coupled to said second control means for curately indicating the range represented by e position of said range mark, an auxiliary dicating device for alternately presenting two dependent sets of data, said first set of data ing presented during a first time interval durg which said antenna is scanning a sector in ace including the azimuth indicated by said dial marker and said second set of data being esented during a second time interval during hich said antenna is not scanning said sector space, said auxiliary indicator comprising a thode ray tube indicator, means for causing a ot to appear on the screen of said indicator at distance from a first axis that is indicative the difference between the azimuth to the secected target and the azimuth indicated by said dial marker and at a distance from a second is oriented at right angles to said first axis lat is indicative of the difference between the nge to said selected target and the range incated by said range mark, and an error cor:cting means operative during said second time terval comprising means for intensifying the am of said cathode ray tube indicator whereby le trace of said beam becomes visible, first iriable signal means coupled to said first conol means and connected to said cathode ray lbe indicator so as to deflect the beam of said idicator in a direction perpendicular to said rst axis, second variable signal means coupled to said second control means and connected to said cathode ray tube indicator so as to deflect the beam of said indicator in a direction perpendicular to said second axis, said first and second variable signal means having a normal output such that said intensified beam is normally positioned at the intersection of said two axes, said variable signal means having output characteristics such that when said first and second control means are moved to a position such that said beam coincides with said target spot on said screen, said radial marker and said range marker are accurately positoned in coincidence with said selected target indication on said plan position indicator, and means for returning said two variable signal sources to their normal condition without altering the position of said control means each time said antenna scans said sector including the azimuth represented by said radial marker.

5. An object position indication system for a radio object location system comprising a cathode ray tube indicator having a persistent screen, first means which when coupled to said indicator energize said screen to produce a twocoordinate display on said screen of range and an angular coordinate of a selected area of space, second means which when coupled to said indicator energize said screen to produce a marker spot at a given point on said screen, third means for alternately coupling said first and second means to said indicator, fourth means coupled to said second means for translating the position of said marker spot into respective indications of range and angular coordinate, and fifth means coupled to said second means for shifting the position of said marker spot on said screen, whereby the range and angular coordinate of any object within said selected area may be determined by superimposing said marker spot over the persistent image of said object on said screen.

6. An object position indication system according to claim 5 and further including means coupled to said fifth means for shifting the center position of the selected area displayed on said screen at the same rate and in the same direction as the shifting of said marker spot.

7. An object position indication system according to claim 6 and further including means coupled to said second and fifth means for causing said marker spot to return to said given point on said screen at the beginning of each coupling of said second means to said indicator.

LELAND J. HAWORTH.

References Cited in the file of this patent

UNITED STATES PATENTS

| Number | Name | Date |
|---|---|---|
| 2,355,363 | Christaldi | Aug. 8, 1944 |
| 2,395,966 | Goldberg | Mar. 5, 1946 |
| 2,416,320 | Jeanne | Feb. 25, 1947 |
| 2,419,205 | Feldman | Apr. 22, 1947 |
| 2,459,481 | Wolff et al. | Jan. 18, 1949 |
| 2,468,032 | Busignies | Apr. 26, 1949 |
| 2,480,208 | Alvarez | Aug. 30, 1949 |
| 2,512,703 | Wilkerson | June 27, 1950 |
| 2,566,332 | Huber et al. | Sept. 4, 1951 |

FOREIGN PATENTS

| Number | Country | Date |
|---|---|---|
| 812,975 | France | May 21, 1937 |
| 552,072 | Great Britain | Mar. 22, 1943 |